April 21, 1925.  1,534,147
H. A. VEAL
AIR BRAKE PIPE CONNECTION
Filed Dec. 5, 1923
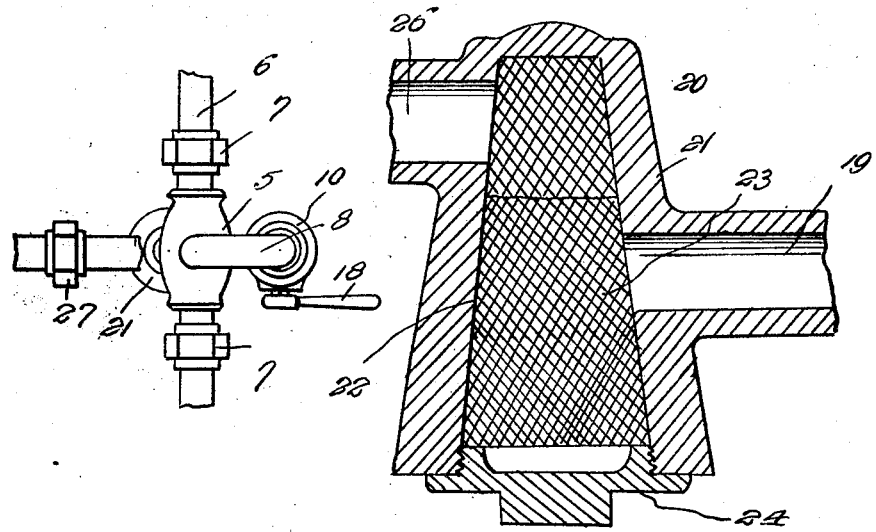
H.A. Veal.
Inventor Patented Apr. 21, 1925.

1,534,147

UNITED STATES PATENT OFFICE.

HENRY A. VEAL, OF DOUGLAS, GEORGIA.

AIR-BRAKE-PIPE CONNECTION.

Application filed December 5, 1923. Serial No. 678,701.

*To all whom it may concern:*

Be it known that I, HENRY A. VEAL, a citizen of the United States, residing at Douglas, in the county of Coffee and State of Georgia, have invented certain new and useful Improvements in Air-Brake-Pipe Connections, of which the following is a specification.

This invention relates to an improved connection or by-pass adapted to be interposed between the usual air line of the brake system of a car and the triple valve which controls the air to the brake cylinder of the braking mechanism, the primary object of the invention residing in the provision of a single unit comprising a brake strainer, cut-out cock and dirt collector so arranged with respect to each other that but little dirt or water within the brake pipe will pass to the triple valve of the air brake cylinder, for consequently impairing the efficient operation thereof.

An additional object of this invention resides in the provision of such a connection between the air brake pipe of a triple valve of the brake cylinder wherein there will be little or no liability of other companies attempting to steal or break the dirt collector of the present invention when installed upon cars, due to the fact that the breaking or removal of the same will place the car entirely out of commission and the air cannot be gotten through the train.

A still further object of the invention resides in the provision of such a connection that may be easily and expeditiously applied between said air brake pipe and the triple valve of the brake cylinder, and this by those even unskilled in the art.

With the above and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the different views, Figure 1 is a top plan view of a connection constructed in accordance with the present invention, Figure 2 is a side elevational view thereof, Figure 3 is an enlarged detail sectional view through the dirt collector per se of the present invention, Figure 4 is a similar view through the cut-out cock whereby the air from the air line to the triple valve of the brake cylinder may be turned on or cut off at will, and Figure 5 is a perspective of the rotary core of said cut-out cock.

Now having particular reference to the drawing, this improved connection embodies the provision of a conventional form of brake pipe strainer 5 that is adapted for disposition within the usual air line 6 of the car, and this through the medium of suitable couplings 7—7.

Said brake pipe strainer 5 is equipped upon its top side and at a point substantially intermediate its ends ends with a branch pipe 8 of substantially inverted J-shape as clearly shown in Figure 2, it being of course noted that by the provision of a pipe of this shape there will be little or no liability of any dirt or water within the air line 6 passing upwardly into the branch pipe and consequently downwardly through the cut-out cock 9 that is permanently attached to said brake pipe strainer 5 through the medium of the branch pipe 8.

Said cut-out cock 9 is arranged vertically as clearly shown in the drawing and embodies a casing 10 formed with a transversely arranged tapered socket 11 in one of its sides and within which is arranged a tapered bushing 12 closed at its lower end as clearly shown in Figure 4.

Rotatably arranged within said bushing 12 is the valve core 13 that is also tapered and provided at one end with a stem 15 that engages through alined openings in the closed end of the bushing 12 and valve casing 10, the projecting end of this stem being squared and provided with a screw-threaded socket. Arranged within said socket is a threaded plug 16, formed upon a nut 16' while arranged upon the squared portion of the stem 15 is an operating handle 18. Between the handle and nut 18 and 16' respectively and encircling the stem is an expansible coil spring 17 for maintaining a tight fit between the valve casing and plug and for also compensating for any wear therebetween. The core 13 is provided with an elongated by-pass 18' for establishing communication between the inverted J-shaped branch pipe 8 and an L-branch pipe 19 rigidly secured at one end to the outlet of the cut-out cock when the handle 18 is moved to a position parallel with said cut-out cock 9.

The latter mentioned branch pipe 19 is integrally joined at its other end to a dirt collector designated generally 20. This dirt collector 20 comprises a circular tapered casing 21 that is formed with a tapered socket 22 that opens at the lower end of the casing and within which is removably arranged a strainer 23 of suitable wire mesh. The tapered socket 22 within said casing 20 opens at its lower end and is internally screw-threaded for the reception of a plug 24. The branch pipe 19 enters the dirt collector 20 intermediate its ends, while at the upper end of said dirt collector there is formed an outlet pipe 26 adapted to be coupled as at 27 to the usual inlet of the triple valve of the air brake cylinder, said outlet 26 being formed upon a side of the collector from that of the pipe 19.

It will thus be seen that I have provided a connection between the air line and the triple valve of the brake cylinder of a car braking system that will answer all of the purposes above described, and even though I have herein set forth the most practical embodiment of the invention with which I am at this time familiar, it is nevertheless to be understood that minor changes may be made in the invention without departing from the spirit and scope of the appended claims.

Having thus described my invention, what I claim as new and desire to secure by Letters Patent, is:—

1. A by-pass for installation in an air brake pipe line between the air supply pipe and the triple valve, said by-pass comprising a single unit including a pair of spaced strainers connected together by a valved conduit, said conduit including a substantially J-shaped inverted branch, connected with the top of the upper strainer and having the horizontal portion thereof disposed on a plane above the strainer to prevent passage of water through the by-pass.

2. A by-pass for installation in an air brake pipe line between the supply pipe and the triple valve, said by-pass comprising a horizontally disposed strainer for disposition in the supply line, an inverted substantially J-shaped branch pipe connected to the top of said strainer, a valve to which the other end of the branch pipe is connected, a second branch pipe connected with said valve, and a vertically disposed dirt collecting chamber connected with said last named branch, said chamber being opened at its bottom and closed by a removable plug and having a removable strainer positioned therein.

3. A by-pass for installation in an air brake pipe line between the supply line and the triple valve, a by-pass including branches for communication with the supply pipe and the triple valve, and a cut-out cock disposed in said by-pass, said cock embodying a casing formed with a transversely disposed socket intersecting its longitudinal bore, said socket being open at one end, a tapered bushing insertable through the open end of the socket, and a rotary valve plug removably fitted into the open end of the bushing, and means for retaining said plug in place.

In testimony whereof I affix my signature.

HENRY A. VEAL.